Patented Oct. 27, 1953

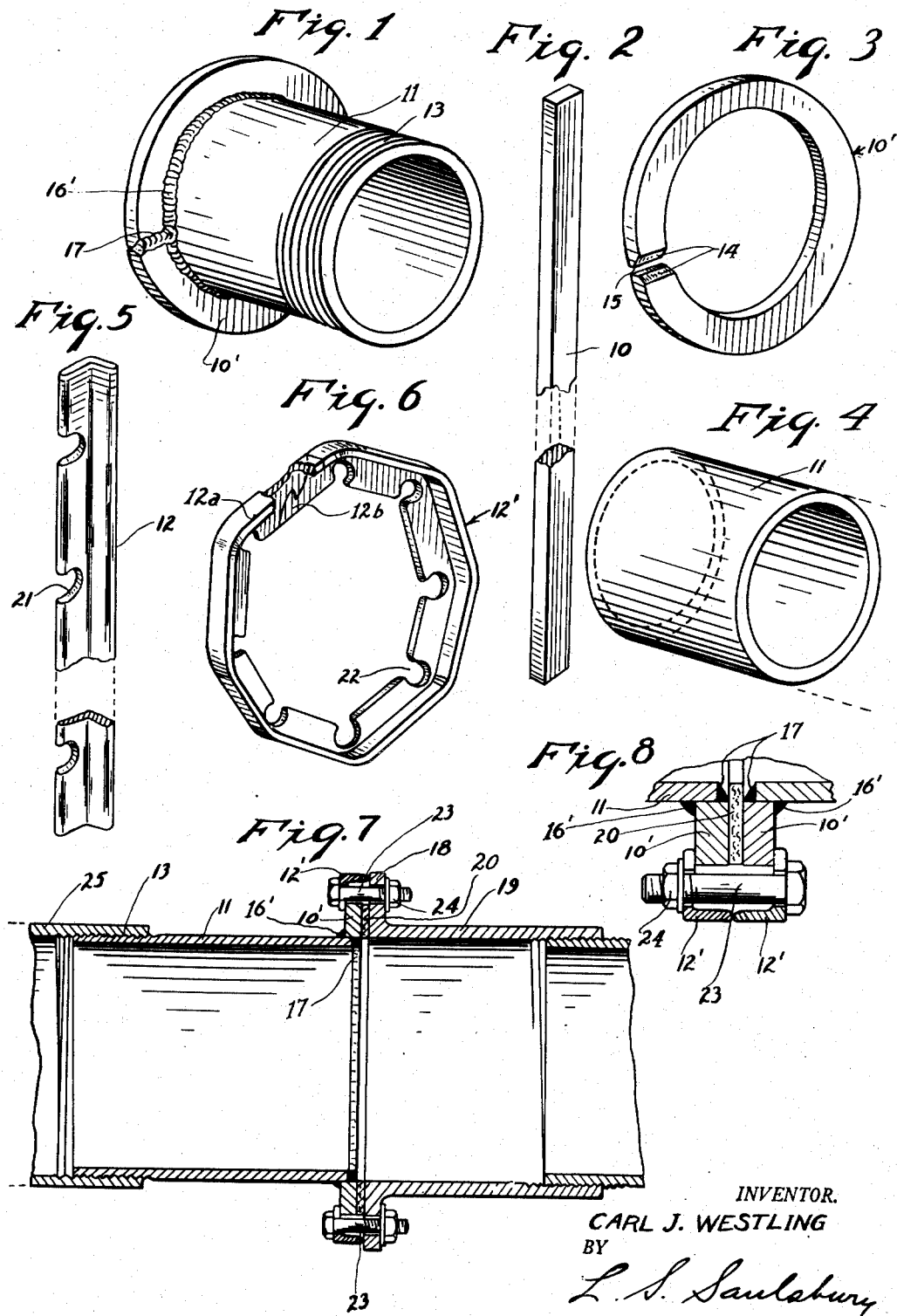

2,656,594

UNITED STATES PATENT OFFICE 2,656,594

METHOD OF FORMING BOLT-RETAINING RINGS FOR FLANGED PIPE COUPLING ASSEMBLIES

Carl J. Westling, West Orange, N. J., assignor to Vulcan Research Corporation, Pittsburgh, Pa., a corporation of Pennsylvania Application November 2, 1950, Serial No. 193,616

1 Claim. (Cl. 29—156)

This invention relates to a method of making a bolt-retaining ring for flanged pipe coupling assemblies.

It is an object to provide a bolt-retaining ring for use with flanged pipe couplings that can be formed out of a standard stock angle piece by simple cutting and bending operations.

It is another object of the invention to provide a pipe coupling assembly having as a part thereof a bolt-retaining ring formed according to the present method and out of standard angle piece stock.

Other objects of the invention are to provide a method of forming a bolt-retaining ring for flange pipe couplings which can be carried out in a simple manner and by which a bolt-retaining ring is formed which is inexpensive to manufacture, adapted for use with a flanged coupling formed of standard stock pipe and bar pieces, durable, and retains the bolts evenly spaced about the flanges of the pipe couplings joined together.

For other objects and for a better understanding of the invention, reference may be had to the following detailed description taken in connection with the accompanying drawing, in which Fig. 1 is a perspective view of the split ring flange portion of the two-element pipe flange coupling assembled by welding the flange portion upon a standard stock tubing according to the present invention.

Fig. 2 is a perspective view of the bar stock piece which is used for forming the split flange ring.

Fig. 3 is a perspective view of the bar stock piece after it has been bent and made into the split ring flange portion.

Fig. 4 is a perspective view of a standard stock tubing piece to which the split ring flange piece is welded to form the one of the coupling members shown in Fig. 1.

Fig. 5 is a perspective view of the notched angle section piece used to form the notched angle ring bolt retainer.

Fig. 6 is a perspective view of the notched angle flange ring element which is adapted to contain the connecting bolts used to connect the coupling member with other coupling members of standard pipe flanges or for connecting together two coupling members formed according to the present invention.

Fig. 7 is a longitudinal sectional view of an assembly of pipe coupling members, one of the coupling members being constructed according to the present invention.

Fig. 8 is a fragmentary sectional view showing two of the pipe coupling members of the present invention connected together, an internal weld being effected between the end of the tube and the inner periphery of the ring, the ring extending beyond the end of the tube piece.

Referring now particularly to Figs. 2, 4 and 5, there is shown respectively the fixed flange portion stock piece 10 before it has been rolled or bent, tube length 11 and notched angle piece 12 used in making the loose bolt retainer ring element 12'. These pieces are all made from standard stock shapes.

One end of the tube length 11 is externally threaded, as shown at 13, while the opposite end has the split flange ring 10' connected thereto. This flange ring 10' is formed, as shown in Fig. 3, by edgewise bending or rolling of the flat bar stock piece 10, the ends of which have been chamfered, as indicated at 14, and slightly spaced apart from one another to provide a gap 15. The inner diameter of the split ring 10' is very slightly larger than the outside diameter of the standard tube length 11 to provide a snug fit of the split ring therearound.

The split flange ring 10' is placed about the end of the pipe 11 so that it extends beyond the end of the pipe and is welded in the gap 15 thereof with welding material 16 and with weld material 16' distributed about the inner face of the ring and upon the outer surface of the pipe and about the inner periphery of the ring and the end of the tube, as indicated at 17, Fig. 8. The fixed element of the coupling is thus formed in a manner which, in effect, shrinks the ring onto the tube before the weld is made around the pipe.

The fixed flange ring portion is of less width than the ordinary flange indicated at 18 of a standard flange-type cast pipe coupling 19, Fig. 7. Also, there are no holes for the bolts in the flange ring portion 10'. The outside diameter of the flange ring portion is made the same as the outside diameter of standard ring gasket 20 for pipe flanges and which has an inside diameter equal to the inside diameter of the pipe, Fig. 7. These gaskets fit inside of the standard pipe flange bolt circle.

In order to couple the flange ring portion 10' to the standard flange 18, Fig. 7, a notched angle bolt retainer ring 12' having notches 21 spaced from one another along one flange is used. This ring 12' is formed in the same manner as the flange ring and from standard stock piece shown in Fig. 5. The ends of the ring 12' are interlocked with hook formations 12a and 12b. This completed ring is shown in Fig. 6 and the notches 21 of the piece 12, shown in Fig. 5, become partially closed openings 22 adapted to retain the coupling bolts against lateral and longitudinal displacement. The bolts 23, as shown in Fig. 7, will extend through these openings 22 in the retainer ring 12'. The ring has straight sides and bends at the notch locations.

The retainer ring 12' can be slid into place along the pipe length 11 and into engagement with the flange ring 10 and the bolts 23 will be extended through the openings 22 and through openings in the flange 18 in the standard pipe fitting or coupling member 19 and when nuts 24 are tightened upon the flange 18 of the standard fitting 19, the flange of the retaining ring 12' will be drawn tight against the flange 18, as shown in Fig. 7. The retainer ring 12' will accordingly retain the bolts 23. A pipe 25 can be screw threaded upon threads 13 of the tube length 11.

In Fig. 8, two couplings of the present invention are shown connected together. A standard ring gasket 20 is interposed between the respective flange ring portions 10' and the bolts are wholly contained in two bolt retainer rings 12' formed according to the showing of Fig. 6. Bolts 23 will hold the bolt retaining rings 12' and the flanges in a fluid-tight manner with the sealing gasket 20 disposed therebetween.

It should now be apparent that there has been constructed a coupling assembly economical and simple to install wherein the assembling can be effected with the tools ordinarily available in the field where such couplings would be used.

It should be further apparent that the coupling elements have been formed of standard stock material and without waste or special machining and having strength and tightness comparable to standard cast flange couplings 19.

While various changes may be made in the detail construction, it shall be understood that such changes shall be within the spirit and scope of the present invention as defined by the appended claim.

What is claimed is:

The method of forming a bolt-retaining ring for flanged pipe couplings which consists of cutting open notches with a semi-circular contour at their inner ends in one flange of an angle stock piece so as to extend from the free edge of the flange to a point adjacent to the other flange thereof, said notches being spaced from one another along the one flange, bending the other flange in a flatwise manner at the notches so as to partially close the notches at the free edge of the one flange and to form bolt-retaining openings in the ring and simultaneously forming the stock piece into a polygonal shape, and finally joining the ends of the stock piece together.

CARL J. WESTLING.

References Cited in the file of this patent

UNITED STATES PATENTS

| Number | Name | Date |
| --- | --- | --- |
| 283,136 | Mosler | Aug. 14, 1883 |
| 1,525,647 | Haughey | Feb. 10, 1925 |
| 1,784,142 | Hosking | Dec. 9, 1930 |
| 1,928,823 | Young | Oct. 3, 1933 |
| 2,293,997 | Neuhaus | Aug. 25, 1942 |
| 2,427,685 | Midtyling | Sept. 23, 1947 |
| 2,451,500 | Greid | Oct. 19, 1948 |
| 2,613,719 | Conrad | Oct. 14, 1952 |